United States Patent Office 3,321,472
Patented May 23, 1967

---

3,321,472
N-(TRICHLORO-O-DINITROPHENYL)-
HETEROCYCLIC AMINES
Alan James Lambie and Geoffrey Tatersall Newbold, Saffron Walden, and Michael Barry Purdew, Cambridge, England, assignors to Fisons Pest Control Limited, Harston, England
No Drawing. Filed Jan. 4, 1965, Ser. No. 423,303
Claims priority, application Great Britain, Jan. 11, 1964, 1,337/64
10 Claims. (Cl. 260—247)

The present invention relates to new compounds and processes for preparing them.

It has been found that 1,2,3,4-tetrachloro-5,6-dinitrobenzene reacts with a cyclic secondary amine to replace one of the chlorine atoms by the amine. This is to be contrasted with the reaction of 1,2,3,4-tetrachloro-5,6-dinitrobenzene with a primary amine where the amine replaces one of the nitro groups.

Accordingly the present invention is for a process for the preparation of compounds of the general formula:

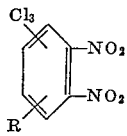

where R is a heterocyclic ring attached to the benzene ring through a nitrogen atom which comprises reacting 1,2,3,4-tetrachloro-5,6-dinitrobenzene with a cyclic secondary amine, other than pyrrolidine or ethyleneimine.

The process according to the present invention may be carried out at various temperatures; thus, for example, the reaction may be carried out at a temperature from room temperature up to the boiling point of the reaction mixture. It is usually preferred to use a temperature above 50° C.

The reaction may conveniently be carried out in the presence of a solvent, for example an anhydrous alcohol, such as anhydrous ethanol. Alternatively the reaction may be carried out in the absence of an added solvent, employing the amine as the solvent for the 1,2,3,4-tetrachloro-5,6-dinitrobenzene.

The cyclic secondary amine used in the process of the present invention may comprise for example morpholine, piperidine, 1-methylpiperazine or 1-phenylpiperazine. The compounds pyrrolidine and ethyleneimine are not suitable as they cause replacement of a nitro group. The cyclic secondary amine preferably contains a saturated six-member ring, and is suitably of the formula:

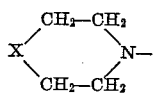

where X is as identified below.

The present invention is also for the new compounds of the general formula:

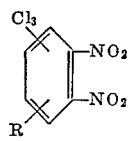

where R is a heterocyclic ring attached to the benzene ring through a nitrogen atom. According to a preferred embodiment of the invention R comprises the radical

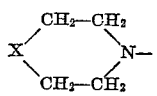

where X is an oxygen atom, a methylene group or an alkylamino or arylimino group.

Compounds according to the present invention which may be mentioned include 4-(trichloro-o-dinitrophenyl)-morpholine, 1-(trichloro-o-dinitrophenyl)-piperidine, 1-methyl-4-(trichloro-o-dinitrophenyl)-piperazine and 1-phenyl-4-(trichloro-o-dinitrophenyl)-piperazine.

The compounds according to the present invention are fungicides. These compounds are also useful as intermediates in the manufacture of insecticides and fungicides.

The present invention is also for fungicidal compositions which contain as an active ingredient a compound of the general formula:

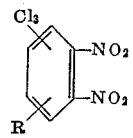

wherein R is a heterocyclic ring attached to the benzene ring through a nitrogen atom. Fungicidal compositions suitably also contain wetting agents and/or solid diluents. The wetting agents may be non-ionic, cationic or anionic; the solid diluents may be for example clay, sand, talc, mica and the like.

The following examples are given to illustrate the present invention. The parts and percentages quoted are by weight.

Example 1

To a stirred suspension of 30.6 parts of 1,2,3,4-tetrachloro-5,6-nitrobenzene in 100 parts of ethylalcohol were added 17.4 parts of morpholine and the resulting mixture was heated on a steam bath until complete solution was obtained. The solution became bright orange and after standing for 2–3 hours a bright orange solid crystallised. The yield of 4-(trichloro-o-dinitrophenyl)-morpholine after drying was 20 parts (56.1%) with melting point 110–112° C. Recrystallisation from ethyl alcohol gave a crystalline product of melting point 123–124° C.

Analysis.—Found: C, 33.45; H, 2.50; Cl, 30.10; N, 11.80%. $C_{10}H_8Cl_3N_3O_5$ requires: C, 33.68; H, 2.26; Cl, 29.84; N, 11.78%.

Example 2

The process of Example 1 was repeated, replacing the morpholine by 1-methylpiperazine giving 1-methyl-4-(trichloro - o - dinitrophenyl) - piperazine of melting point 110–112° C.

Analysis.—Found: C, 35.75; H, 3.20; Cl, 28.90%. $C_{11}H_{11}Cl_3N_4O_4$ requires: C, 35.74; H, 3.00; Cl, 28.78%.

Example 3

The process of Example 1 was repeated replacing the morpholine by piperidine giving 1-(trichloro-o-dinitrophenyl)-piperidine of melting point 107–109° C.

Analysis.—Found: C, 37.25; H, 2.95; Cl, 30.15%. $C_{11}H_{10}Cl_3N_3O_4$ requires: C, 37.26; H, 2.84; Cl. 30.00%.

Example 4

To a stirred suspension of 72 parts of 1,2,3,4-tetrachloro-5,6-dinitrobenzene in 160 parts of ethyl alcohol were added 71 parts of 1-phenylpiperazine in 40 parts of ethyl alcohol and the mixture heated until all the solid dissolved. The reaction mixture became bright red in colour and was allowed to cool. After 2 hours a solid crystallised, which was filtered off, extracted into chloroform, washed with water, dried and evaporated in vacuo to give 100 parts (98.4% yield) of 1-phenyl-4-(trichloro-o-dinitrophenyl)-piperazine. Recrystallisation from a mixture of ethyl alcohol and acetone gave the pure compound, melting point 163–165° C.

*Analysis.*—Found: C, 44.80; H, 3.10; Cl, 24.50%.
$C_{16}H_{13}Cl_3N_4O_4$ requires: C, 44.51; H, 3.03; Cl, 24.64%.

Example 5

Tomato plants (*Lycopersicum esculentum*) were grown to the stage of 3 true leaves in individual pots. They were then sprayed to run-off with suspensions of compositions prepared by grinding each of the compounds identified below with three times its weight of china clay and incorporating 3% of the non-ionic wetting agent "Tensiofix WP" and 5% of the sulphite by-product "Wafex." The suspensions contained 0.5% of the compound, and five replicates were carried out.

After the spray deposits had dried the plants were further sprayed with an aqueous suspension of spores of the fungi *Alternaria solani*; the plants were then held in the dark in high humidity for 24 hours. After a further week of growth under normal conditions, the development of the fungi was assessed on the treated plants compared with the untreated control plants.

The results obtained were as follows.

| Compound: | Percent control of fungal growth |
|---|---|
| 4-(trichloro-o-dinitro-phenyl)-morpholine | 85 |
| 1-methyl-(trichloro-o-dinitrophenyl)-piperazine | 90 |

Example 6

Bean plants (*Vicia faba*) were grown to the stage of 3 true leaves in individual pots. They were then sprayed to run-off with suspensions of compositions prepared by grinding each of the compounds identified below with three times its weight of china clay and incorporating 3% of the non-ionic wetting agent "Tensiofix WP" and 5% of the sulphite by-product "Wafex." The suspensions contained 0.5% of the compound, and five replicates were carried out.

After the spray deposits had dried the plants were further sprayed with an aqueous suspension of spores of the fungi *Botrytis fabae*; the plants were then held in the dark in high humidity for 24 hours. After a further week of growth under normal conditions, the development of the fungi was assessed on the treated plants compared with the untreated control plants.

The results obtained were as follows.

| Compound: | Percent control of fungal growth |
|---|---|
| 1-methyl-(trichloro-o-dinitrophenyl)-piperazine | 75 |
| 1-(trichloro-o-dinitrophenyl)-piperidine | 80 |

We claim:
1. A process for the preparation of a compound of the formula:

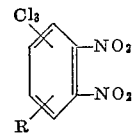

where R is a heterocyclic ring attached to the benzene ring through a nitrogen atom, which comprises reacting 1,2,3,4-tetrachloro-5,6-dinitrobenzene with a cyclic secondary amine, other than pyrrolidine and ethyleneimine.

2. A process as claimed in claim 1 which is carried out at a temperature in the range 50° C. up to the boiling point of the reaction mixture.

3. A process as claimed in claim 1 which is carried out in an anhydrous alcohol.

4. A process as claimed in claim 1 which is carried out in excess of the cyclic secondary amine.

5. A process as claimed in claim 1 wherein the cyclic secondary amine is morpholine, piperidine, 1-methylpiperazine, 1-phenylpiperazine.

6. A new compound of the formula:

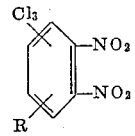

where R is a heterocyclic ring attached to the benzene ring through a nitrogen atom, R being selected from the group consisting of morpholino, piperidino and piperazino.

7. 4-(trichloro-o-dinitrophenyl)-morpholine.
8. 1-(trichloro-o-dinitrophenyl)-piperidine.
9. 1-methyl-4-(trichloro-o-dinitrophenyl)-piperazine.
10. 1-phenyl-4-(trichloro-o-dinitrophenyl)-piperazine.

References Cited by the Examiner

Qvist et al.: Chemical Abstracts, vol. 54, p. 6593 (1960).

ALEX MAZEL, *Primary Examiner.*

JOSE TOVAR, *Assistant Examiner.*